(12) United States Patent
Olson et al.

(10) Patent No.: US 8,892,622 B2
(45) Date of Patent: Nov. 18, 2014

(54) PIPELINED DIVIDE CIRCUIT FOR SMALL OPERAND SIZES

(75) Inventors: Christopher H. Olson, Austin, TX (US); Jeffrey S. Brooks, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 690 days.

(21) Appl. No.: 13/081,991

(22) Filed: Apr. 7, 2011

(65) Prior Publication Data

US 2012/0259907 A1 Oct. 11, 2012

(51) Int. Cl.
*G06F 7/52* (2006.01)
*G06F 7/535* (2006.01)

(52) U.S. Cl.
CPC ........ *G06F 7/535* (2013.01); *G06F 2207/3884* (2013.01)
USPC ............ 708/650; 708/200; 708/490; 708/504

(58) Field of Classification Search
None
See application file for complete search history.

(56) References Cited

U.S. PATENT DOCUMENTS

| | | | | |
|---|---|---|---|---|
| 4,992,968 | A * | 2/1991 | Adiletta | ........................ 708/650 |
| 5,016,210 | A * | 5/1991 | Sprague et al. | ............... 708/655 |
| 5,957,997 | A | 9/1999 | Olson et al. | |
| 6,275,838 | B1 | 8/2001 | Blomgren et al. | |
| 6,460,134 | B1 | 10/2002 | Blomgren et al. | |
| 6,542,916 | B1 | 4/2003 | Hinds et al. | |
| 6,557,021 | B1 | 4/2003 | Brooks et al. | |
| 6,889,241 | B2 | 5/2005 | Pangal et al. | |
| 7,080,111 | B2 | 7/2006 | Pangal et al. | |
| 7,099,910 | B2 | 8/2006 | Brooks et al. | |
| 7,392,273 | B2 | 6/2008 | Gerwig et al. | |
| 7,730,117 | B2 | 6/2010 | Fleischer et al. | |
| 7,912,887 | B2 | 3/2011 | Dockser et al. | |
| 8,046,399 | B1 | 10/2011 | Inaganti et al. | |
| 2005/0228844 | A1 | 10/2005 | Dhong et al. | |
| 2009/0287757 | A1 | 11/2009 | Rarick | |

OTHER PUBLICATIONS

Schmookler, et al.; "Leading Zero Anticipation and Detection—A Comparison of Methods"; Proceedings of the 15th IEEE Symposium on Computer Arithmetic; 2001, pp. 7-12.

Eric Charles Quinnell, "Floating-Point Fused Multiply-Add Architectures," Chapter 2, PhD Dissertation at University of Texas at Austin, May 2007.

T. Lang and J. D. Bruguera, "Floating-Point Fused Multiply-Add with Reduced Latency," Proceedings of the 2002 IEEE International Conference on Computer Design: VLSI in Computers and Processors, pp. 145-150, 2002.

(Continued)

*Primary Examiner* — Michael D Yaary
(74) *Attorney, Agent, or Firm* — Rory D. Rankin; Meyertons, Hood, Kivlin, Kowert & Goetzel, P.C.

(57) ABSTRACT

A pipelined circuit for performing a divide operation on small operand sizes. The circuit includes a plurality of stages connected together in a series to perform a subtractive divide algorithm based on iterative subtractions and shifts. Each stage computes two quotient bits and outputs a partial remainder value to the next stage in the series. The first and last stages utilize a radix-4 serial architecture with edge modifications to increase efficiency. The intermediate stages utilize a radix-4 parallel architecture. The divide architecture is pipelined such that input operands can be applied to the divider on each clock cycle.

17 Claims, 11 Drawing Sheets

(56) References Cited

OTHER PUBLICATIONS

E. Hokenek, R. Montoye and P.W. Cook, "Second-Generation RISC Floating Point with Multiply-Add Fused," IEEE Journal of Solid-State Circuits, vol. 25, pp. 1207-1213, 1990.

A. Naini, A. Dhablania, W. James and D. Das Sarma, "1 GHz HAL Sparc64 Dual Floating Point Unit with RAS Features," Proceedings of the 15th Symposium on Computer Arithmetic, pp. 173-183, 2001.

* cited by examiner

PIPELINED DIVIDE CIRCUIT FOR SMALL OPERAND SIZES

BACKGROUND OF THE INVENTION

1. Field of the Invention

This disclosure relates generally to computer processors, and in particular to a circuit for performing a pipelined divide operation for small operand sizes.

2. Description of the Related Art

Computer processors typically have special units for handling arithmetic operations. The most difficult of the four traditional arithmetic operations tends to be division. Typically, divide operations are long latency, low throughput operations. Often a divide unit is built to handle large operands, such as 53-bit mantissa operands from a double-precision floating point number as defined by the IEEE 754 standard. The result of the divide operation will usually be available after a large number of cycles determined by the length of the input operands.

Typically, there is a minimum overhead involved in performing a divide operation, so that if a divide unit handles large operand sizes, the small operand sizes will still have a long latency, even though the latency potentially could be reduced. Additionally, if there is only one divide unit for a particular processor, multiple threads may be sharing the same divide unit, leading to long delays if one thread is waiting for divide operations from another thread to finish.

There are a variety of different ways to implement a divider, and one such way is though the use of a subtractive algorithm. In such an approach, a divider may be configured to iteratively produce a quotient from a dividend (i.e., a numerator) and a divisor (i.e., a denominator) by performing a sequence of shift, subtract, and compare operations, similar to standard long division. Subtractive division algorithms may generally be characterized by the following equation:

$$P_{j+1} = rP_j - q_{j+1}D$$

where $P_j$ denotes the partial remainder, r denotes the radix of the algorithm, D denotes the divisor, and $q_{j+1}$ denotes the quotient digit corresponding to the partial remainder generated by a given iteration of the algorithm. Successive partial remainders may be generated by multiplying a previous partial remainder by the radix and then subtracting the product of the selected quotient digit and the divisor. For example, a divider may be configured to implement a restoring division algorithm in which the quotient digits 'q' are selected from the set {0, 1}. As indicated by the above equation, the quotient digit is an input that determines the next partial remainder.

If a divider were limited to small operand sizes, and the divide operation were completed in only a few cycles, it would allow for a considerable improvement in the latency and efficiency of the divider as compared to a divider that has to handle large operand sizes. Furthermore, if the architecture were pipelined, new dividend and divisor input operands could be applied to the divider on each instruction cycle instead of waiting for each instruction to finish. Therefore, what is needed is a way to perform a divide operation on small operand sizes using a pipelined architecture, to reduce the latency and increase throughput of the divide unit.

In view of the above, improved circuits for performing a divide operation on small operand sizes are desired.

SUMMARY OF THE INVENTION

Various embodiments of circuits for performing a divide operation of a dividend and a divisor for small operand sizes are contemplated. In one embodiment, if the dividend is negative, an effective dividend may be generated as the two's complement value of the dividend. If the divisor is positive, an effective divisor may be generated as the two's complement value of the divisor. In various embodiments, a circuit may include a plurality of serially-connected stages. Each stage may receive an effective divisor and a first partial remainder as inputs on each clock cycle. The first partial remainder may be (N−1) zero bits followed by the most significant bit of an effective dividend, wherein 'N' is the bit-width of each of a dividend and divisor. Each stage may generate a second partial remainder and a plurality of quotient digits as outputs on each clock cycle. The second partial remainder may be input to a subsequent stage of the plurality of serially-connected stages.

The first and last stage of the plurality of stages may utilize a restoring series architecture. In one embodiment, the restoring series architecture may be a radix-4 series architecture for computing two quotient bits per clock cycle. A radix-4 series stage may include a first adder, and the first adder may receive the first partial remainder and the effective divisor as inputs and generate a first sum and a first carry as outputs. A first quotient bit may be equal to the first carry. The radix-4 series stage may also include a first multiplexer, a second adder, and a second multiplexer. The first multiplexer may receive the first partial remainder and the first sum as data inputs and the first carry as a select input. The output of the first multiplexer may be doubled and then coupled to the input of the second adder. A most significant bit (MSB) of the effective dividend may fill the vacated least significant bit (LSB) of the doubled output of the first multiplexer. The second adder may receive the doubled output of the first multiplexer and the effective divisor as inputs and generate a second sum and a second carry as outputs. A second quotient bit may be equal to the second carry. The second multiplexer may receive the doubled output of the first multiplexer and the second sum as data inputs and the second carry as a select input. The output of the second multiplexer may be doubled and coupled to a subsequent stage. A next MSB of the effective dividend may fill the vacated LSB of the doubled output of the second multiplexer, and the effective dividend may be quadrupled after each stage.

For the first stage of the plurality of stages, the first adder may be replaced with a logical AND gate to generate the first carry. Alternatively, the first adder may be replaced by a combination of NAND and NOR gates to generate the first carry. Also, the first multiplexer of the first stage may receive the first partial remainder and a zero value as data inputs. For the last stage of the plurality of stages, the second multiplexer may be removed.

The intermediate stages of the plurality of stages may utilize a restoring parallel architecture to perform the quotient bit computations. In one embodiment, the restoring parallel architecture may be a radix-4 parallel architecture for computing two quotient bits per clock cycle. A radix-4 parallel stage may include a first adder, and the first adder may receive a doubled first partial remainder, the effective divisor, and a doubled effective divisor as inputs and generate a first sum and a first carry as outputs. The radix-4 parallel stage may also include a second adder, a third adder, a fourth adder, and a multiplexer. The second adder may receive the first sum and the first carry as inputs and generate a second sum and second carry as outputs. The third adder may receive the doubled first partial remainder and the effective divisor as inputs and generate a third sum and a third carry as outputs. The fourth adder may receive the first partial remainder and the effective divisor as inputs and generate a fourth sum and a fourth carry as outputs. A first quotient bit may be equal to the fourth carry. The multiplexer may receive the second sum, third sum, doubled fourth sum, and doubled first partial remainder as data inputs, and the select input of the multiplexer may be determined by the second carry, third carry, and fourth carry. The second quotient bit may also be determined by the second carry, third carry, and fourth carry. The select input may determine the selection of the output of the multiplexer. The output of the multiplexer may be doubled and coupled to an input of a subsequent stage of the plurality of stages. The MSB of the effective dividend may fill the vacated LSB of the doubled first partial remainder and the doubled fourth sum. Furthermore, the next MSB of the effective dividend may fill the vacated LSB of the doubled output of the multiplexer.

In some embodiments, the circuit may include a plurality of series of serially-connected stages, wherein each series is configured to perform a divide operation, and wherein the plurality of series are configured to concurrently perform a plurality of independent divide operations on a plurality of pairs of dividends and divisors to generate a plurality of quotients. In various embodiments, a processing unit may be configured to perform divide operations utilizing a divider circuit with a series of serially-connected stages.

These and other features and advantages will become apparent to those of ordinary skill in the art in view of the following detailed descriptions of the approaches presented herein.

BRIEF DESCRIPTION OF THE DRAWINGS

The above and further advantages of the circuits and mechanisms may be better understood by referring to the following description in conjunction with the accompanying drawings, in which.

DETAILED DESCRIPTION

In the following description, numerous specific details are set forth to provide a thorough understanding of the circuits and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
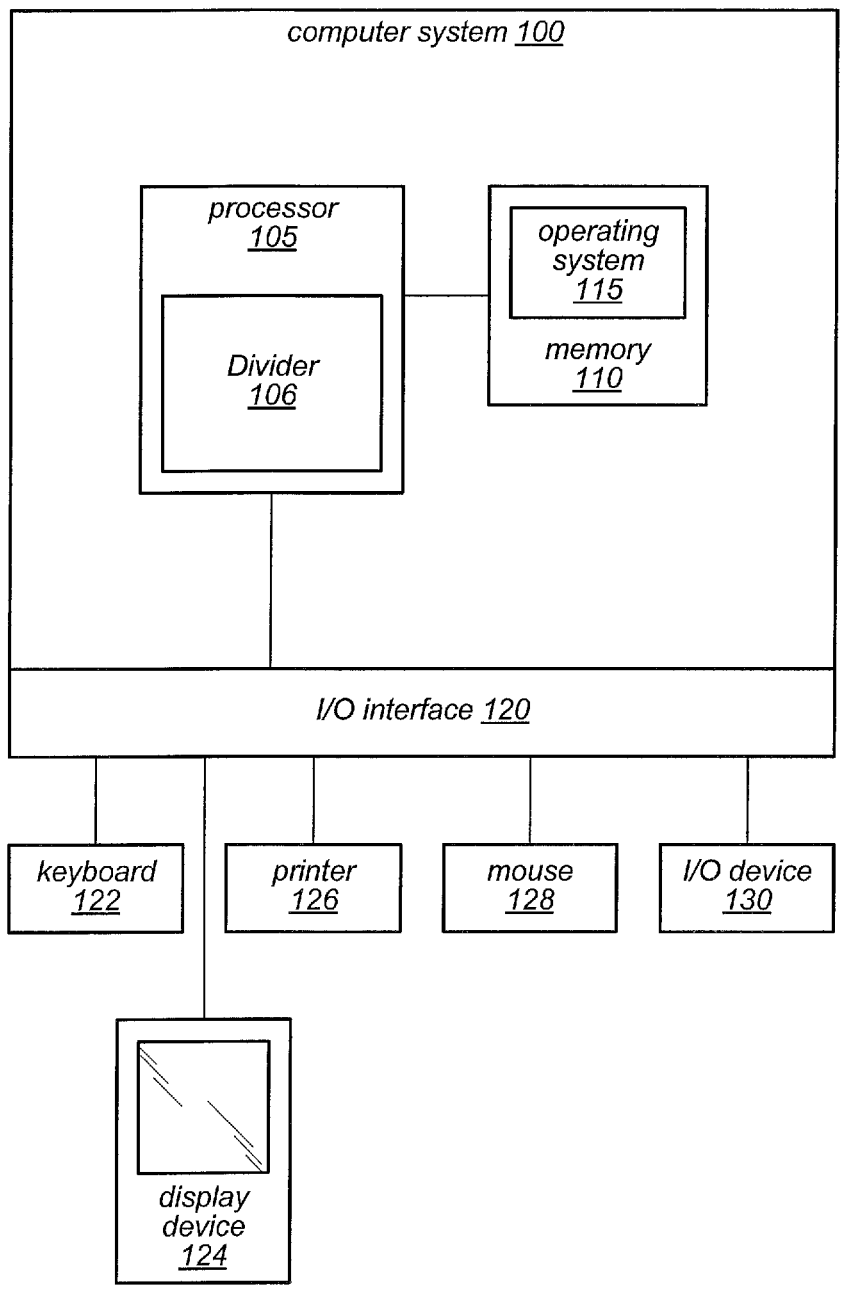
FIG. 1 illustrates one embodiment of a computer system including a processor with a divider.

Referring to FIG. 1, one embodiment of a computer system including a processor with a divider is shown. Processor 105 may be any of various processing units, as desired. For example, processor 105 may be a central processing unit (CPU) of various types, including an x86 processor, e.g., a Pentium class, a PowerPC processor, a CPU from the SPARC family of RISC processors, as well as others. Other processor types such as microprocessors are envisioned.

As shown, computer system 100 may also include a memory medium 110, typically comprising RAM and referred to as main memory, which may be coupled to a host bus by means of a memory controller. The main memory 110 may be configured to store an operating system 115 as well as application programs, etc., as well as other software for operation of the computer system. One or more of the software programs may cause the processor to execute divide instructions using divider 106, as described herein. In some embodiments, divider 106 may be part of an arithmetic logic unit, vector execution unit, floating point graphics unit, or other execution unit within processor 105. In various embodiments, processor 105 may utilize divider 106 for performing divide operations on small operands, and processor 105 may utilize another divider (not shown) for performing divide operations on large operands.

Computer system 100 will typically have various other devices/components, such as other buses, memory, peripheral devices, a display, etc. For example, as shown, the computer system 100 may include an I/O interface 120 which may be coupled to a keyboard 122, display device 124, printer 126, mouse 128, and/or other I/O device 130. Thus, various embodiments of a divider and operation thereof may be performed by a processor inside a computer system.

Figure 2:
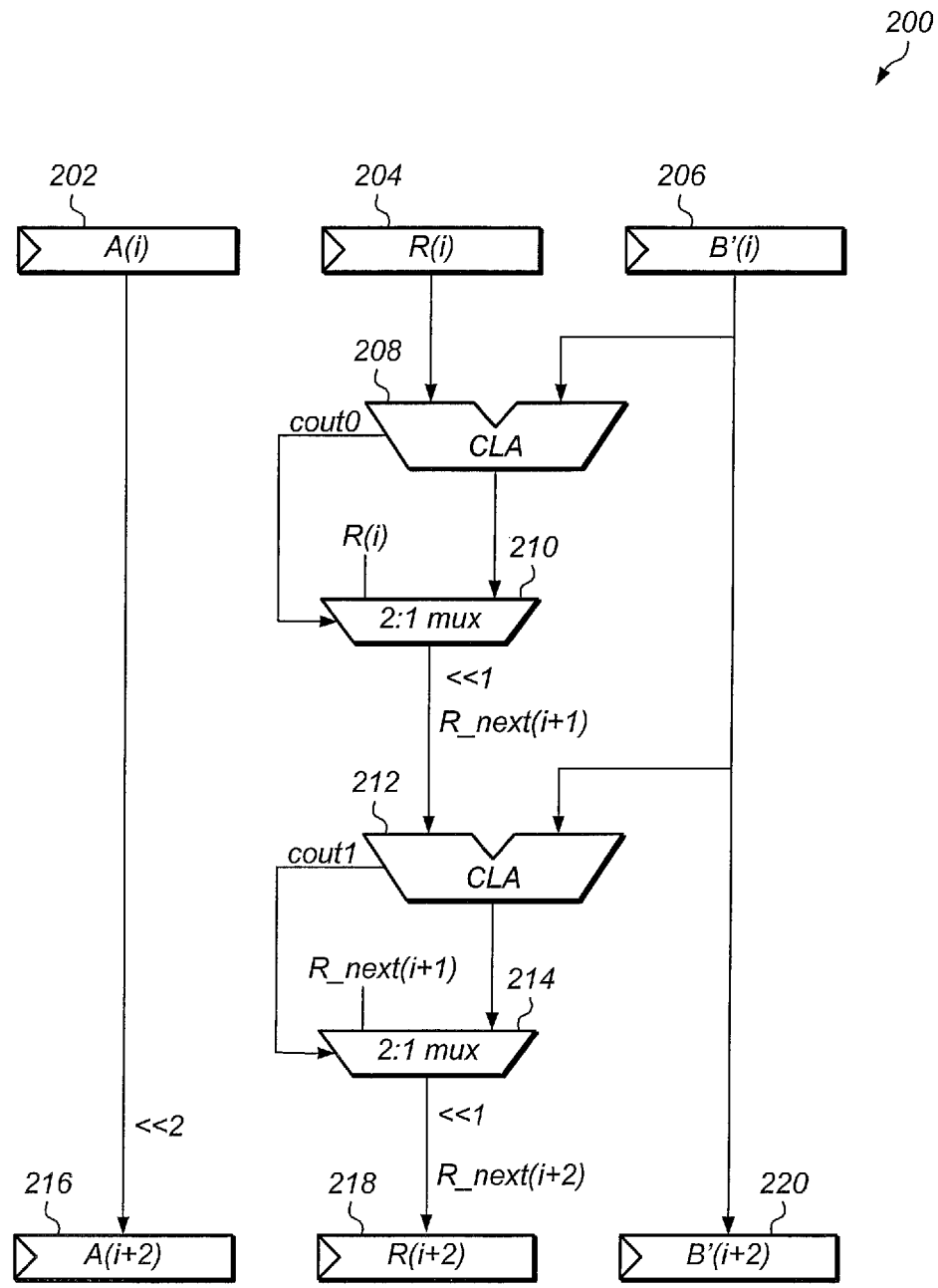
FIG. 2 is a block diagram of a radix-4 serial stage in accordance with one or more embodiments.

Referring to FIG. 2, a block diagram of one embodiment of a radix-4 (two bits per cycle) serial stage is shown. In one embodiment, a divider pipeline may include one or more serially-connected radix-4 stages. The radix-4 serial stage may be used on the edges of a divide pipeline, such that the first and last stages of the pipeline may be implemented with radix-4 serial stages. The intermediate stages in the middle of the pipeline may be radix-4 parallel stages. In another embodiment, all of the serially-connected radix-4 stages may be radix-4 parallel stages. In a further embodiment, all of the serially-connected radix-4 stages may be radix-4 serial stages. In a still further embodiment, one or more of the stages may be radix-4 serial stages and the remainder of the stages may be radix-4 parallel stages.

In various embodiments, stage 200 may be utilized as the first stage and the last stage in a plurality of serially-connected stages coupled together to perform a divide operation. The architecture of stage 200 is based on having a positive effective remainder R(i) and a negative effective divisor B'(i). The effective remainder may be based upon the dividend operand. If the dividend is negative, an effective dividend may be generated as the two's complement value of the dividend. The effective remainder R(i) may then be generated from the effective dividend. If the divisor is positive, an effective divisor B'(i) may be generated as the two's complement value of the divisor. The two's complement of a binary number may be obtained by inverting the binary number and then incrementing that value. Any one of a number of known techniques may be employed to convert a binary number into a two's complement representation. In various embodiments, an XOR gate may be used to invert a binary number, and then the output of the XOR gate may be incremented to produce the two's complement representation of the binary number.

In one embodiment, the divide operation may be performed on small operand sizes, such as dividend and divisor operands of size 8 bits. With dividend and divisor operand sizes of 8 bits, a divider may be composed of a series of four radix-4 stages, with each radix-4 stage generating two quotient bits. In another embodiment, the divide operation may be performed on dividend and divisor operands of size 16 bits, in which case the divider may be composed of eight radix-4 stages. In other embodiments, divide operations may be performed on other sizes of input operands utilizing dividers with other numbers of serially-connected stages.

As described above, two quotient bits per cycle may be calculated by the illustrated embodiment of stage 200. The first quotient bit may be equal to cout0, the carry output of carry lookahead adder (CLA) 208. The second quotient bit may be equal to cout1, the carry output of CLA 212. In one embodiment, the quotient bits may be converted to a two's complement form before the quotient is output from the divider. In various embodiments, other operations may be performed on the quotient. For example, the quotient may need to be normalized and/or rounded according to an appropriate rounding scheme. If the quotient is being determined within a saturating number system, the quotient may need to be saturated to a minimum or maximum value.

Additionally, in some embodiments, the number of bits in the quotient may not be evenly divisible by the number of quotient bits produced per cycle. For example, in cases where the number of bits in the quotient is odd, a radix-4 stage may produce one more quotient bit than is required. In some embodiments, post-processing of the quotient may be utilized to remove the spurious bit. In various embodiments, if a divide operation will result in an odd number of bits, the final stage in the series may be a single radix-2 stage. Alternatively, a dividend and/or divisor operand with an odd number of bits may be padded up to an even number of bits. For example, a 7-bit dividend operand may be padded and handled as an 8-bit operand. In this case, pre-processing of the input operands may be utilized instead of post-processing on the quotient output.

Flip-flop 202 may be configured to store the value of the effective dividend A(i). The 'i' value indicates the step of the division operation associated with the computation of a single quotient bit, with 'i' taking on values from 0 to 'N−1', wherein 'N' is the total number of quotient bits being calculated for the divide operation. In some embodiments, the dividend and divisor operands may have the same number of bits. In other embodiments, the dividend and divisor operands may not have the same number of bits. In various embodiments, if the dividend and divisor operands do not have the same number of bits, the shorter operand may be zero padded to make the lengths of the operands equal.

Flip-flop 216 may be configured to store the value of the effective dividend A(i+2). The effective dividend A(i+2) represents the effective dividend A(i) after two quotient bits have been computed. A(i) may be shifted left two bits (i.e., quadrupled) to generate A(i+2). The two MSB's of A(i) may be appended to the LSB of R_next(i+1) and to the LSB of R_next(i+2), respectively.

Flip-flop 204 may be configured to store the value of the partial remainder R(i). R(i) may be a partial remainder that was generated in a prior stage and coupled to stage 200, or if stage 200 is the first stage of the divider, R(i) may be the initial remainder. If stage 200 is the first stage of the divider, R(i) may be referred to as R(0). In one embodiment, R(i) may have a bit-width of N, where N is the number of bits in the divisor. For example, if N=8, then R(i) may have a bit-width of 8, and the initial remainder R(0) may be seven zero bits followed by the MSB of the effective dividend. In another embodiment, R(i) may have a bit-width of 2*N−1. For example, if N=8, then R(i) would have a bit-width of 15, and the initial remainder R(0) may be seven zero bits followed by the eight bits of the effective dividend.

Flip-flop 206 may be configured to store the value of the effective divisor B'(i). The divisor operand may be represented by the value B(i), and B'(i) may be the two's complement of B(i) if the divisor B(i) is positive. Flip-flop 220 may be configured to store the value of B'(i+2). The value of B'(i+2) may be the same as the value of B'(i). In general, the value of B'(i+N) may be the same as B'(i) for all values of N.

CLA 208 may receive the partial remainder R(i) and the effective divisor B'(i) as inputs and generate a sum output and a carry output. If stage 200 is the first stage of the divider, then CLA 208 may be replaced by a faster configuration of logical gates or other circuit elements. This faster configuration may include an (N+1)-input AND gate to calculate the carry output, wherein N is the number of bits of the divisor operand. This configuration may be used for the first stage of the divider because the carry output may only be one if the MSB of the effective dividend A(i) is '1' and if all of the bits of B'(i) are '1'. In another embodiment, the configuration may include an equivalent logical combination of NAND gates and NOR gates. If stage 200 is the last stage of the divider, CLA 208 may be utilized as illustrated in FIG. 2.

The sum output of CLA 208 may be coupled to multiplexer 210 as a data input, and the carry output (cout0) of CLA 208 may be coupled to multiplexer 210 as a select input. The other data input received by multiplexer 210 may be the partial remainder R(i). Cout0 may select which of the data inputs are passed through to the output of multiplexer 210. If cout is '1', then the sum output of CLA 208 may pass through to the output of multiplexer 210, and if cout is '0', then the partial remainder R(i) may be the output. The first quotient bit calculated by stage 200 may be equal to cout0.

The output of multiplexer 210 (i.e., R_next(i+1)) may be shifted left one bit position (i.e., doubled) and then coupled to one of the input ports of CLA 212. In one embodiment, R_next(i+1) may be aligned with one of the inputs of CLA 212 such that R_next(i+1) is effectively shifted one bit to the left. The vacated LSB position of R_next(i+1) may be filled with the MSB of the effective dividend A(i). In another embodiment, each of the inputs to multiplexer 210 may be shifted left one bit instead of having the shift performed on the output of multiplexer 210.

CLA 212 may receive R_next(i+1) and B'(i) as inputs and generate a sum and carry (cout1) as outputs. The sum output may be coupled to a data input of multiplexer 214. The carry output (cout1) may be coupled to the select input of multiplexer 214. The second quotient bit calculated by stage 200 may be equal to cout1. The other data input received by multiplexer 214 may be R_next(i+1). Multiplexer 214 may couple the data input indicated by the select input (cout1) to the output. The output of multiplexer 214 may be shifted left by one bit position (i.e., doubled) and stored in flip-flop 218 for use during the next stage of the divider. The value stored by flip-flop 218 may be referred to as R_next(i+2) or R(i+2). The values in flip-flops 216, 218, and 220 may be coupled as inputs to the next stage of the divider. Alternatively, if stage 200 is the last stage of the divider, then multiplexer 214 and flip-flops 216-220 may not be included as part of stage 200.

Figure 3:
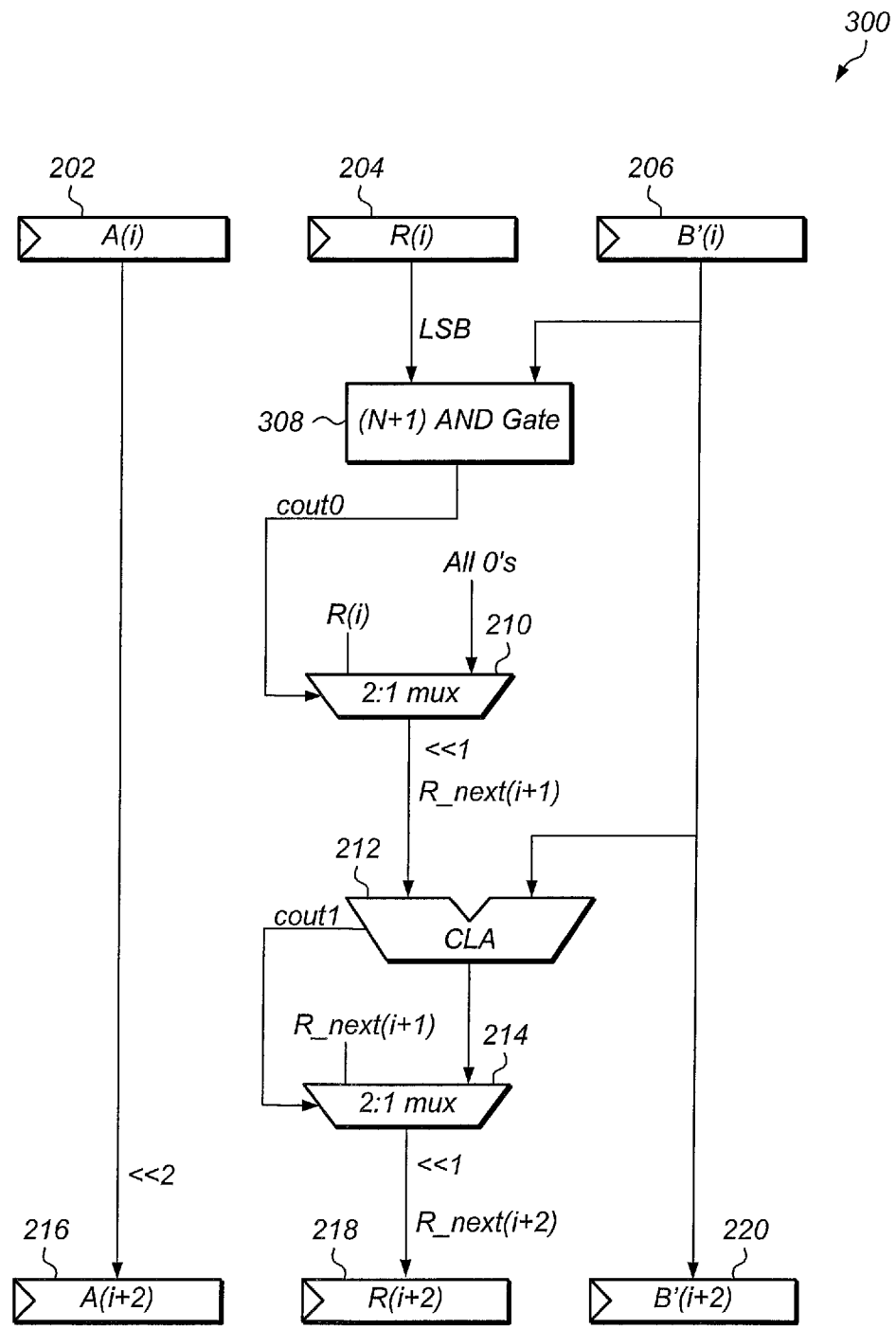
FIG. 3 illustrates one embodiment of a radix-4 serial stage with an edge modification.

Referring now to FIG. 3, a block diagram of one embodiment of a radix-4 serial stage with an edge modification is shown. Stage 300 is similar to stage 200 (of FIG. 2) except for an edge simplification modification which may be utilized if stage 300 is the first stage of a divider. Stage 300 may utilize (N+1)-input AND gate 308 in place of CLA 208 (of FIG. 2), wherein N is the number of bits of effective divisor B'(i). AND gate 308 may utilize less area and be faster than CLA 208. In some embodiments, the input operands may be of size 8 bits, in which case N=8 and AND gate 308 may be a 9-input AND gate.

AND gate 308 may be utilized in the first stage of a divider based on the way the first partial remainder R(0) is generated. The first partial remainder R(0) may be (N−1) zero bits followed by the MSB of the dividend. The carry output signal cout0 may only be '1' if the effective divisor B'(0) is all one bits and if the LSB of R(0) is '1'. In that case, the sum output of CLA 208 would be all zero bits. Therefore, AND gate 308 may receive the effective divisor B'(i) and the LSB of the initial remainder R(0) as inputs and generate the cout0 signal as an output. The data input of multiplexer 210 selected by a cout0 select signal of '1' may be all zero bits. The rest of stage 300 may be the equivalent of stage 200. In other embodiments, AND gate 308 may be replaced with other combinational gates, such as two NAND gates and a NOR gate. Other arrangements of combinational gates may be utilized in place of AND gate 308.

Figure 4:
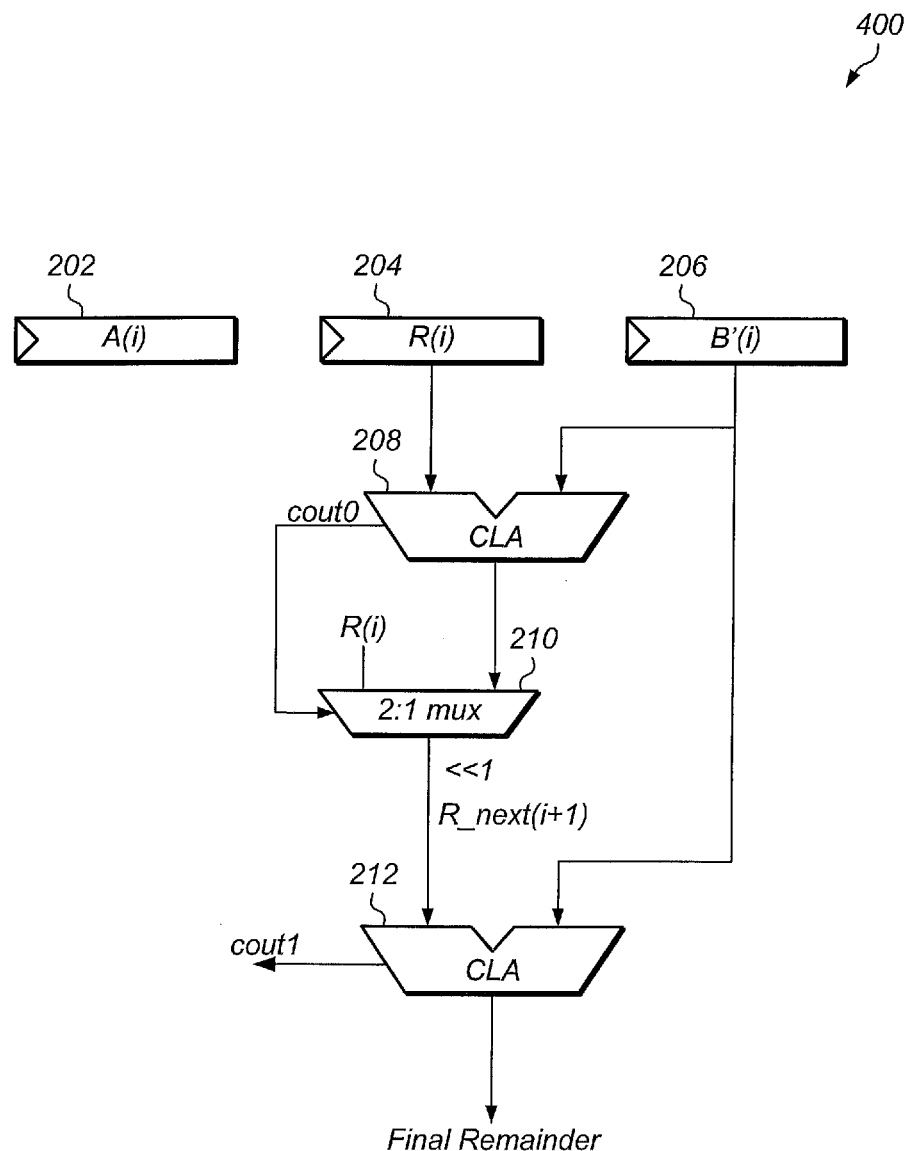
FIG. 4 illustrates another embodiment of a radix-4 serial stage with an edge modification.

Turning now to FIG. 4, a block diagram of one embodiment of a radix-4 serial stage with an edge modification is shown. Stage 400 is similar to stage 200 (of FIG. 2) except for an edge simplification modification which may be utilized if stage 400 is the last stage of a divider. Stage 400 may eliminate the second multiplexer after CLA 212, as the second multiplexer is utilized for selecting the next partial remainder. If stage 400 is the last stage of a divider, the next partial remainder may not be used, and therefore, the second multiplexer may not be needed. The final remainder may be the sum output from CLA 212. The final remainder may or may not be utilized depending on the specific type of divide algorithm being implemented and whether or not rounding is required. The carry output cout1 from CLA 212 may represent the least significant quotient bit.

Figure 5:
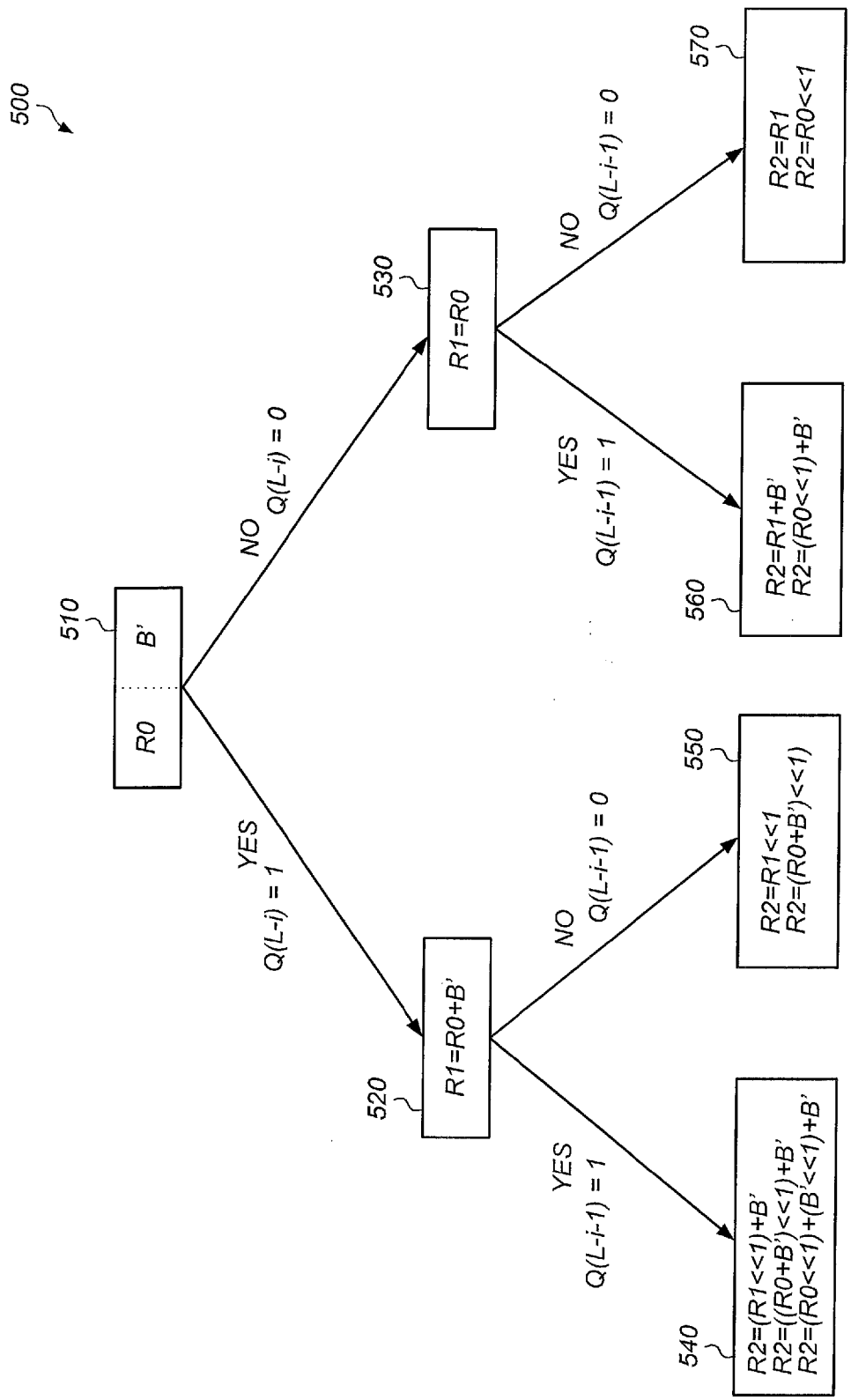
FIG. 5 illustrates one embodiment of a division tree.

Referring now to FIG. 5, a block diagram of one embodiment of a division tree is shown. Division tree 500 represents the various partial remainders that may be generated within a radix-4 parallel stage. Decision tree 500 shows how a radix-4 parallel stage may speculatively compute the possible partial remainders by adding the divisor and shifting in a first case and not adding anything and shifting in a second case for each quotient bit computation operation. By speculatively generating all possible partial remainder values, the critical path of the stage may be shortened.

In block 510, the partial remainder operand R0 and effective divisor operand B' may be the inputs to a radix-4 parallel stage. Block 510 may also represent an adder, and the adder may generate a sum and carry of the inputs R0 and B'. If the carry generated by the adder is one, corresponding to the 'yes' branch of the tree, the next partial remainder may be the value of block 520 (R1=R0+B') shifted left one bit. If the carry generated by the adder is zero, corresponding to the 'no' branch of the tree, the next remainder may be the value of block 530 (R1=R0) shifted left one bit. These are analogous to the calculations performed when utilizing standard long division techniques. The top two branches of the tree may correspond to the generation of the quotient bit Q(L−i), wherein L=(length−1), with length equal to the number of bits in the input operands, and i representing each quotient bit computation operation, with the first operation referred to as i=0.

After the first operation, there are two potential options for each of the partial remainders represented by block 520 or block 530. Each of these partial remainders may be calculated during the first operation, and then a second operation may be performed on the partial remainder value in each of these blocks. For example, an adder may receive as inputs the partial remainder in block 520 (R0+B') and the effective divisor term B' and generate a sum and carry as outputs. The yes branch of the tree extending from block 520 represents the outcome if the carry output is one. The carry output also represents the value of the Q(L−i−1) quotient bit. The partial remainder generated for that potential outcome in block 540 is R2=(R1<<1)+B', which is the R1 value shifted left one bit and added to the divisor term. R2 may also be represented as (((R0+B')<<1)+B') or as ((R0<<1)+(B'<<1)+B'). The no branch of the tree extending from block 520 represents the outcome if the carry output is zero. The partial remainder generated for that potential outcome in block 550 is R2=(R1<<1), which may also be represented as (((R0+B')<<1).

In block 530, an adder may receive as inputs the partial remainder (R1) and the effective divisor term B' and generate a sum and carry as outputs. The yes branch of the tree extending from block 530 represents the outcome if the carry output is one. The partial remainder generated for that potential outcome in block 560 is R2=R1+B', which may also be represented as ((R0<<1)+B'). The no branch of the tree extending from block 530 represents the outcome if the carry output is zero. The partial remainder generated for that potential outcome in block 570 is R2=R1, which may also be represented as (R0<<1).

Each of the four possible outcomes (represented by blocks 540-570) may be calculated by a radix-4 parallel stage. Only one of the four possible outcomes will be utilized, and so the other three possible outcomes will be discarded. This architecture may take up more area than a radix-4 serial stage, but the advantage may be the speed with which the architecture may compute two quotient bits. The speed advantage comes from calculating the second quotient bit for all four possible outcomes without waiting to determine the first quotient bit.

Figure 6:
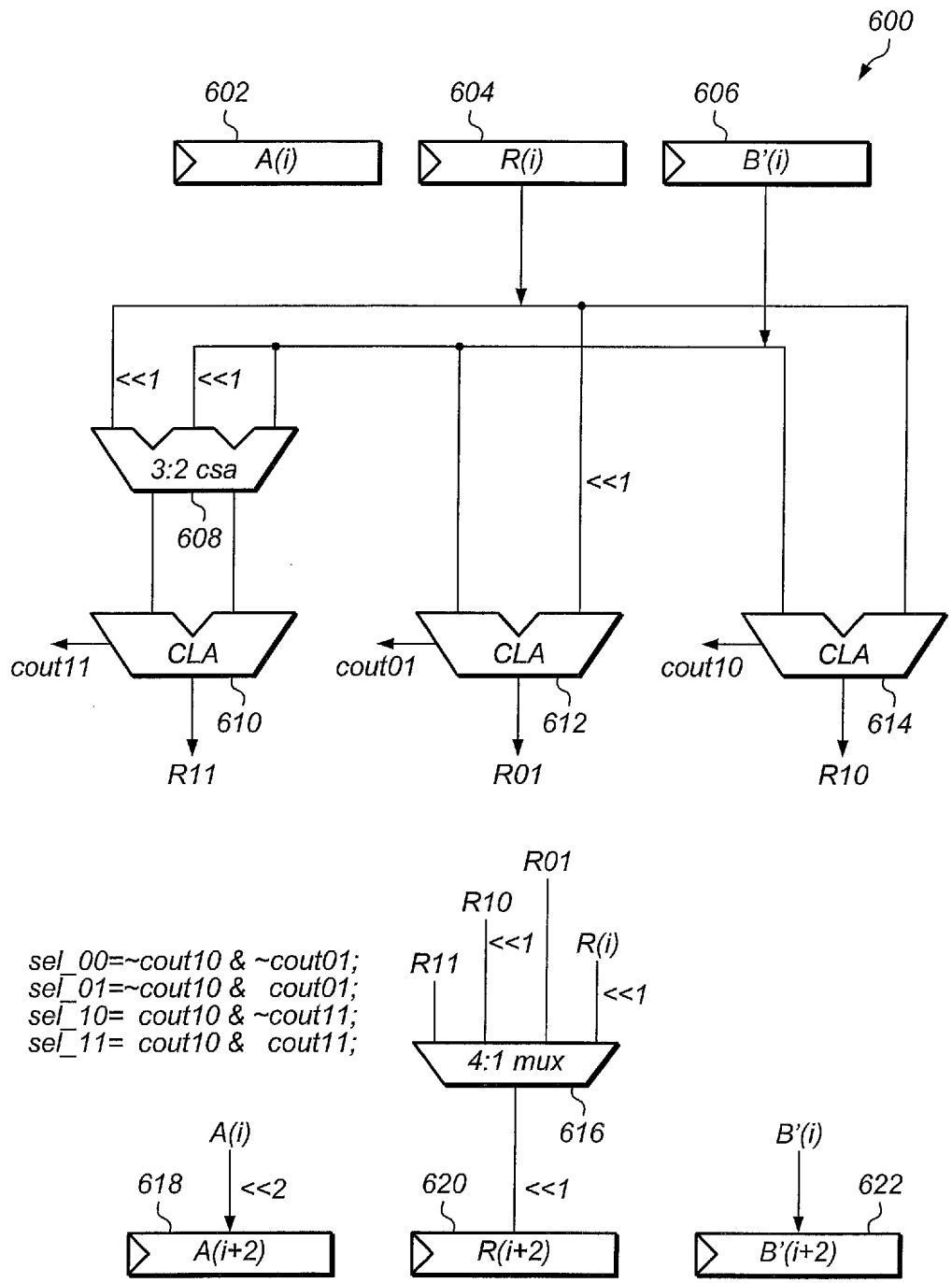
FIG. 6 is a block diagram of one embodiment of a radix-4 parallel stage.

Referring now to FIG. 6, a block diagram of one embodiment of a radix-4 parallel stage is shown. Radix-4 stage 600 may calculate two quotient digits per clock cycle. Flip-flop 602 may be configured to store A(i), the value of the effective dividend. The value A(i) may be coupled to flip-flop 602 from a previous stage. For example, flip-flop 602 may be a flip-flop storing the output value from the stage immediately preceding stage 600. For example, if stage 200 (of FIG. 2) precedes stage 600, then flip-flop 602 may be the same flip-flop as flip-flop 216. Flip-flop 618 may be configured to store A(i+2), which may be A(i) shifted two bits to the left (i.e., quadrupled), with two '0' bits appended to the vacant LSB bit positions.

Flip-flop 604 may be configured to store R(i), the partial remainder value. The partial remainder value may be received from a previous stage of the divider. In one embodiment, flip-flop 604 may be the same as a flip-flop from a prior stage, such as flip-flop 218 (of FIG. 2). Flip-flop 606 may be configured to store B'(i), the effective divisor value. Flip-flop 622 may be configured to store B'(i+2), which may be the same value as B'(i).

The partial remainder value R(i) may be coupled to CLA 614 as an input. R(i) may also be shifted left one bit position and then coupled to each of 3:2 carry save adder (CSA) 608 and CLA 612 as an input. The effective divisor value B'(i) may be coupled as an input to the following circuit elements: CSA 608, CLA 612, and CLA 614. The effective divisor value B'(i) may be shifted left one bit and then coupled as an input to another input port of CSA 608.

The carry and save outputs of CSA 608 may be coupled to the inputs of CLA 610. CLA 610 may generate the carry output signal (cout11) and the partial remainder value (R11) as outputs. CLA612 may generate the carry output signal (cout01) and the partial remainder value (R01) as outputs. CLA614 may generate the carry output signal (cout10) and the partial remainder value (R10) as outputs. Cout11 and R11 correspond to the carry and the partial remainder values that may be utilized if the two quotient bits are calculated as "11" (i.e., Q(L−i)=1 and Q(L−i−1)=1). Cout10 and R10 correspond to the carry and the partial remainder values that may be utilized if the two quotient bits are calculated as "10" (i.e., Q(L−i)=1 and Q(L−i−1)=0, and so on.

The quotient bits, Q(L−i) and Q(L−i−1), may be determined based on the carry output signals from CLA's 610-614. For example, if the third (i=2) and fourth (i=3) quotient bit calculations of the division operation are being performed by stage 600, and the input operands have a bit-width of 8 (L=7), then the quotient bits Q(5) and Q(4) may be calculated by stage 600. The quotient bit Q(L−i) may be determined by cout10, the carry output from CLA 614. The quotient bit Q(L−i−1) may be determined by the logical formula: (~cout10 & cout01)|cout11). In other words, Q(L−i−1) will be '1' if cout10 is '0' and cout01 is '1', or Q(L−i−1) will be '1' if cout11 is '1'. This logical formula may be implemented by any suitable arrangement of circuit elements such as logic gates.

The outputs of CLA's 610-614 may be received as data inputs by multiplexer 616. The output of CLA 614 may be doubled prior to being coupled to multiplexer 616. The doubled partial remainder value R(i) may be the fourth data input to multiplexer 616. The select inputs received by multiplexer 616 may be determined by the values of the cout10, cout01, and cout11 signals as shown in FIG. 6. The select input sel_11 may select the R11 data input, sel_10 may select the R10 data input, sel_01 may select the R01 data input, and sel_00 may select the doubled R(i) data input. Each of the select inputs sel_00, sel_01, sel_10, and sel_11 may be generated using any suitable arrangement of logic gates. One such arrangement may be an inverter gate and an AND gate. Another such arrangement may be an inverter and a NOR gate. Other arrangements are possible and are contemplated.

Figure 7:
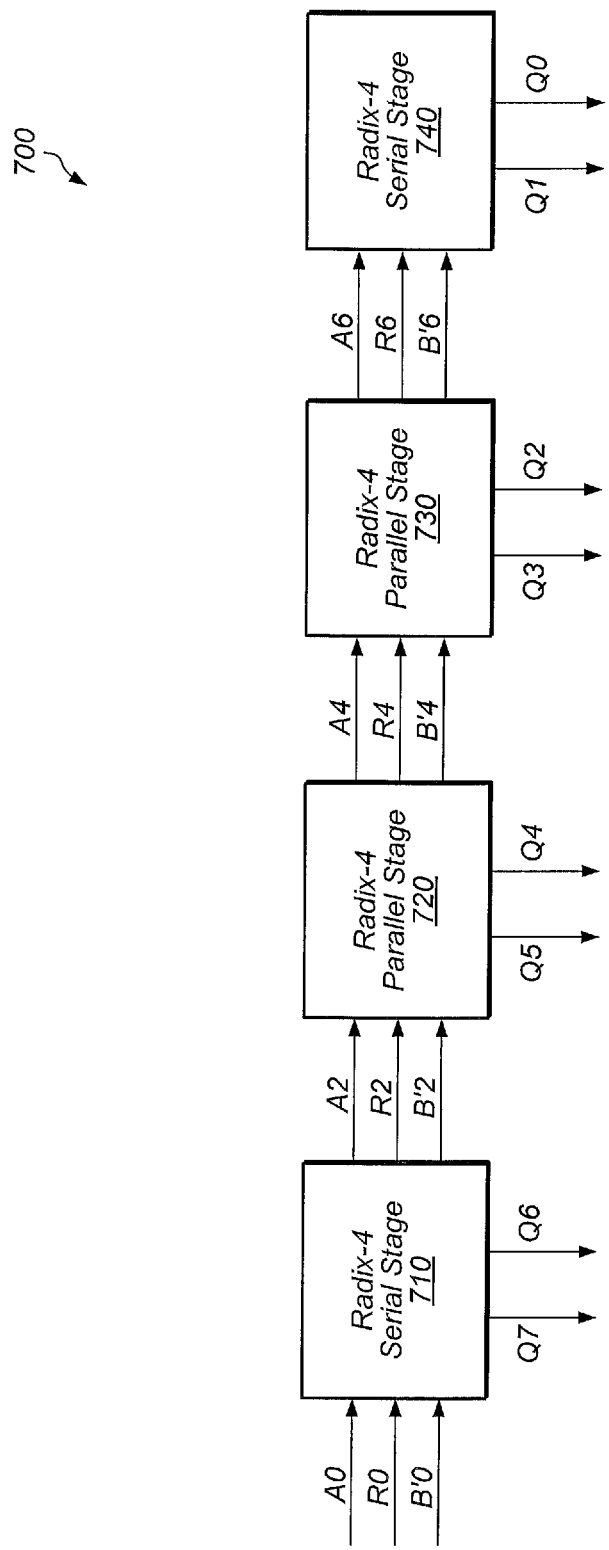
FIG. 7 is a block diagram of a four-stage divider in accordance with one or more embodiments.

Referring now to FIG. 7, a block diagram of a four-stage divider in accordance with one or more embodiments is shown. Divider 700 may be a four-stage divider with an initial radix-4 serial stage 710, two intermediate radix-4 parallel stages 720 and 730, and a final radix-4 serial stage 740. Divider 700 may be used as a divider of 8-bit dividend and divisor operands. Radix-4 serial stage 710 may utilize stage 300 (of FIG. 3) and radix-4 serial stage 740 may utilize stage 400 (of FIG. 4). Radix-4 parallel stages 720 and 730 may utilize stage 600 (of FIG. 6). As discussed herein in regard to FIG. 7, it will be assumed the divider handles dividends and divisors with an operand size of 8 bits. However, other sizes of dividends and divisors may also be processed with dividers consisting of other numbers of stages. For example, a divider with 8 stages may be used to calculate a quotient for dividends and divisors of size 16 bits. For such an embodiment, the first stage may be a radix-4 serial stage, the intermediate six stages may be radix-4 parallel stages, and the last stage may be a radix-4 serial stage.

The values coupled to the inputs of stage 710 may be the effective dividend (A0), partial remainder (R0), and effective divisor (B'0). In another embodiment, the dividend and divisor may be input to stage 710, and the effective dividend, partial remainder, and effective divisor may be generated from the dividend and divisor. Stage 710 may calculate the two most significant quotient bits Q7 and Q6 and output these to a register file or other location. Stage 710 may also output the A2, R2, and B'2 values to stage 720. Stage 720 may generate quotient bits Q5 and Q4 and output the A4, R4, and B'4 values to stage 730, and stage 730 may generate quotient bits Q3 and Q2 and output the A6, R6, and B'6 values to stage 740. Stage 740 may generate the least significant quotient bits Q1 and Q0. Divider 700 may be pipelined such that new input values may be coupled to stage 710 each cycle. There may be an initial latency associated with pipelined divider 700, but after this initial latency, there may be a resultant quotient value available as an output on each cycle.

There may also be a pre-processing engine (not shown) for converting the dividend to it's two's complement form if the dividend is negative. The pre-processing engine may also convert the divisor to it's two's complement form if the divisor is positive. There may also be a post-processing engine (not shown) for converting the quotient to it's two's complement form if the conversion is required based on the signs of the dividend and divisor input operands. The pre-processing and post-processing engines may be implemented with any suitable mechanisms for performing two's complement conversions.

In various embodiments, divider 700 may be used as a divider for larger size operands by looping effective dividend, effective divisor, and partial remainder outputs from stage 740 to the first stage 710 through multiplexers (not shown). In those cases, stages 710 and 740 may not have edge modifications, and instead may utilize the architecture as shown in stage 200 (of FIG. 2). If the input operands (A0, R0, and B'0) have a bit-width larger than 8 bits, then divider 700 may loop back the outputs of stage 740 to stage 710 for as many passes through divider 700 as are needed to complete the divide operation and compute all of the quotient bits. For input operands with a bit-width larger than 8 bits, the circuit elements within stages 710-740 may need to have larger data path widths to accommodate the bit-widths of the input operands.

In some embodiments, there may be one divide unit to perform operations on small size operands (e.g., 8-bit operands) and a second divide unit to perform operations on large size operands (e.g., double-precision floating point operands). In other embodiments, a single divide unit such as divider 700 may be used for all divide operations regardless of the size of the operand. In various embodiments, divider 700 may have various numbers of stages.

Figure 8:
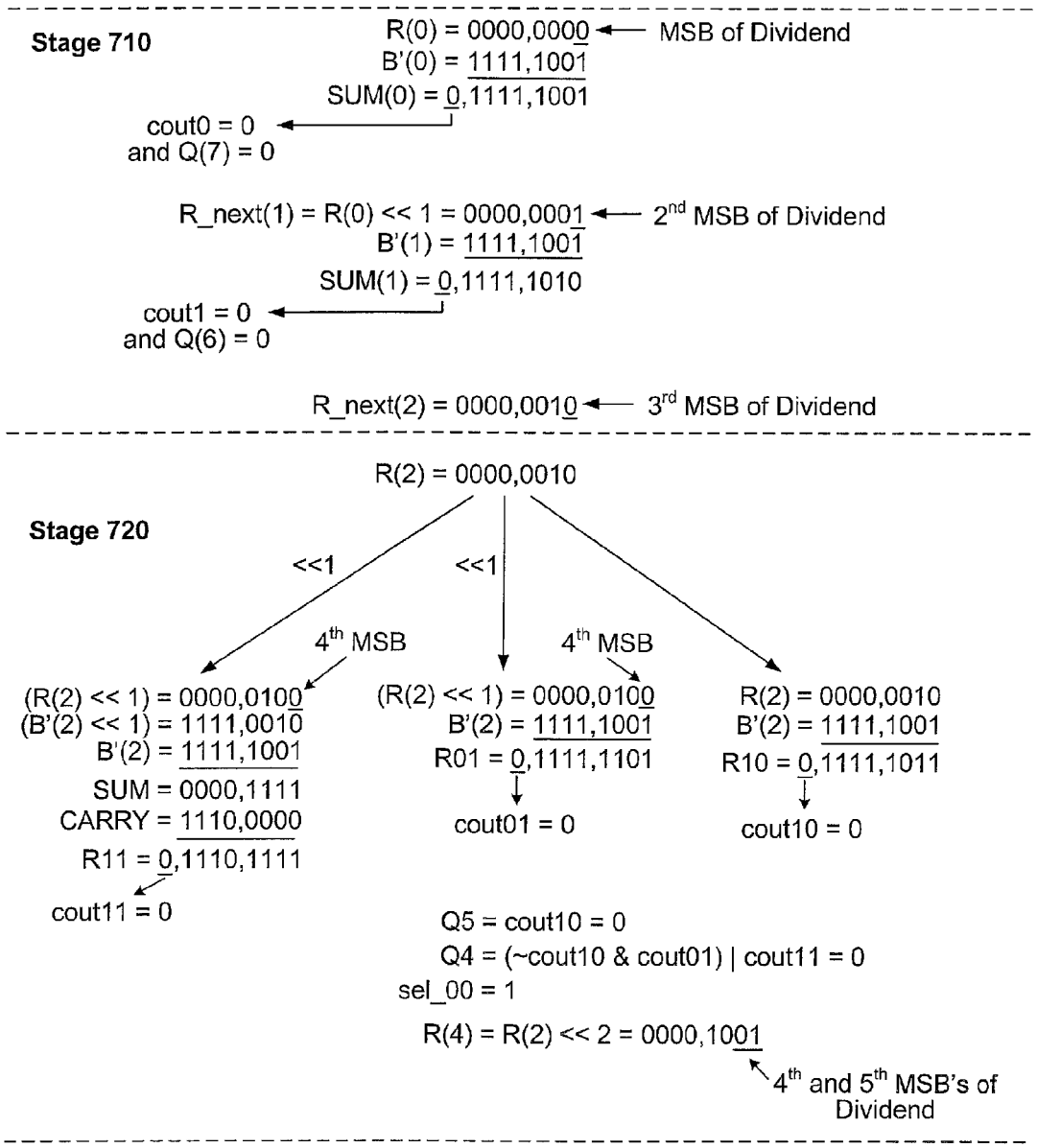
FIG. 8 illustrates the first two stages of an example divide operation in accordance with one or more embodiments.

Referring now to FIG. 8, the first two stages of an example divide operation in accordance with one or more embodiments are shown. The dividend for the example divide operation may be "0100,1101" or 77 in decimal notation. The divisor for the operation may be "0000,0111" or 7 in decimal notation. As the divisor is positive, the two's complement of the divisor may be generated to create the effective divisor B'(0)="1111,1001".

Stage 710 may be the first stage of the divider. Stage 710 may be a radix-4 serial stage, with the same circuit elements as shown in stage 300 (of FIG. 3). The first partial remainder R(0) may be seven 0's followed by the MSB of the dividend, such that R(0)="0000,0000". The carry out signal (cout0) may be generated by a 9-input AND gate. Alternatively, cout0 may be generated by a CLA. Cout0 may be a '0' based on the effective divisor and partial remainder values. The MSB of the quotient, Q(7), may also be '0', as Q(7) may take the value of cout0.

The input R_next(1) to the next adder may be R(0) shifted left one bit position. The $2^{nd}$ MSB of the dividend may fill the vacated LSB of R_next(1). R_next(1) may be added to the effective divisor value B'(1) to produce a sum and carry. The carry output, cout1, may be '0', which will also be the next quotient bit, Q(6). The partial remainder output R_next(2) may be R_next(1) shifted left one bit position, with the $3^{rd}$ MSB of the dividend filling the vacated LSB. R_next(2) may be coupled to stage 720 of the divider.

Stage 720 may receive R(2) (i.e., R_next(2)) as the partial remainder input and generate three different potential partial remainder values (R11, R01, and R10). Stage 720 may be a radix-4 parallel stage, with the same circuit elements as shown in stage 600 (of FIG. 6). The carry outputs (cout11, cout01, and cout10) are all '0' as calculated by stage 720. Therefore, the quotient bits Q(5) and Q(4) are both '0', and the partial remainder R(4) generated as an output is R(2) shifted left two bit positions. The $4^{th}$ and $5^{th}$ MSB's of the dividend may fill the vacated LSB's of R(4). R(4) may be output to stage 730 of the divider.

Figure 9:
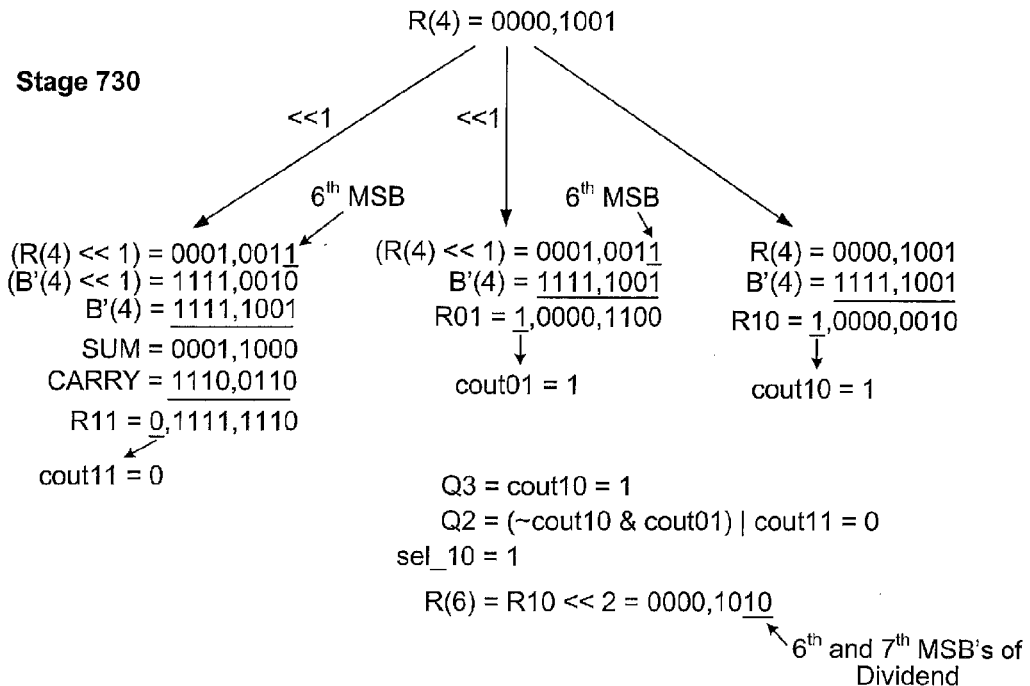
FIG. 9 illustrates the last two stages of an example divide operation in accordance with one or more embodiments.
Figure 9:
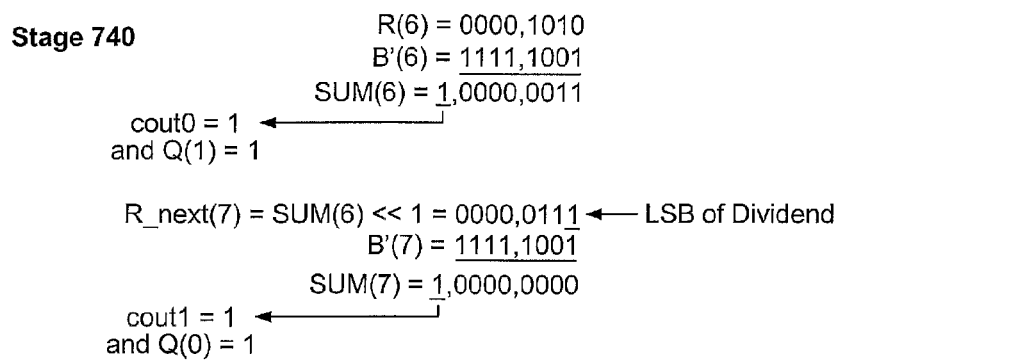

Turning now to FIG. 9, the last two stages of an example divide operation in accordance with one or more embodiments are shown. Stage 730 may receive R(4) as the partial remainder input and generate three different potential partial remainder values (R11, R01, and R10). Stage 730 may be a radix-4 parallel stage, with the same circuit elements as shown in stage 600 (of FIG. 6). The carry outputs (cout01 and cout10) are '1' and cout11 is '0' as calculated by stage 730. Therefore, the quotient bits Q(3) and Q(2) are '1' and '0', respectively. The partial remainder R(6) generated as an output is R10 shifted left two bit positions. The $6^{th}$ and $7^{th}$ MSB's of the dividend may fill the vacated LSB's of R(6). R(6) may be output to stage 740 of the divider.

Stage 740 may receive R(6) as the partial remainder input and add R(6) to the effective divisor value B'(6), creating a carry output and a sum output. Stage 740 may be a radix-4 serial stage, with the same circuit elements as shown in stage 400 (of FIG. 4). The carry output cout0 is '1', and so the quotient bit Q(1) is '1'. Also, the input to the next adder R_next(7) may be the sum output SUM(6) shifted left one bit position. The LSB of the dividend may fill the vacated LSB of R_next(7). R_next(7) may be added to the effective divisor value B'(7), creating a carry output and a sum output. The carry output cout1 is '1', and so the quotient bit Q(0) is '1'. The final quotient value is "0000,1011" or 11 in decimal notation.

Figure 10:
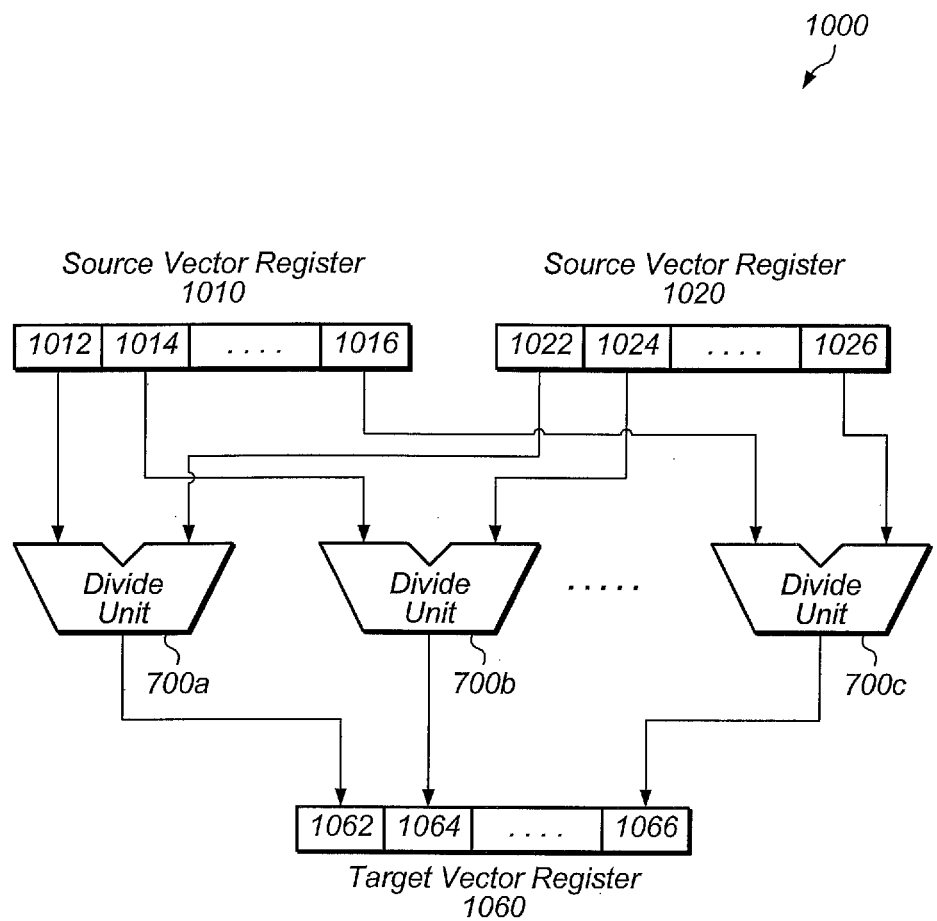
FIG. 10 is a block diagram of a parallel divide architecture with multiple pipelined divide units in accordance with one or more embodiments.

Referring now to FIG. 10, a block diagram of a parallel divide architecture with multiple pipelined divide units is shown. Source vector registers 1010 and 1020 may be configured to store multiple independent operands which may be utilized during multiple parallel divide operations. For example, source vector register 1010 may be configured to store a plurality of dividend values in operands 1012-1016, and source vector register 1020 may be configured to store a plurality of divisor values in operands 1022-1026. Parallel divider 1000 may perform a plurality of divide operations on a plurality of dividend/divisor pairs, wherein the dividend and divisor operands are stored in registers 1010 and 1020, respectively. In one embodiment, divide units 700a-c may generate an initial partial remainder value from the received dividend input. In other embodiments, divide units 700a-c may receive a partial remainder value as a third input. Each of divide units 700a-c may be similar to divider 700 (of FIG. 7).

In some embodiments, registers 1010 and 1020 may be configured to store eight separate operands, with each operand having a size of eight bits. In other embodiments, registers 1010 and 1020 may be configured to store other numbers of operands of other bit-widths. Divide units 700a-c are representative of any number of divide units which may be configured to perform simultaneous independent divide operations in parallel. Divide units 700a-c may be part of a single instruction, multiple data (SIMD) processor configured to perform multiple divide operations in parallel.

Operands 1012 and 1022 may form a dividend/divisor pair, and operands 1012 and 1022 may be received as inputs by divide unit 700a. Divide unit 700a may perform a division operation on operands 1012 and 1022 and generate and store a quotient in location 1062 of target vector register 1060. Similarly, divide units 700b-c may perform divide operations on their respective input operands and generate and store quotients in locations 1064 and 1066 of target vector register 1060.

Figure 11:
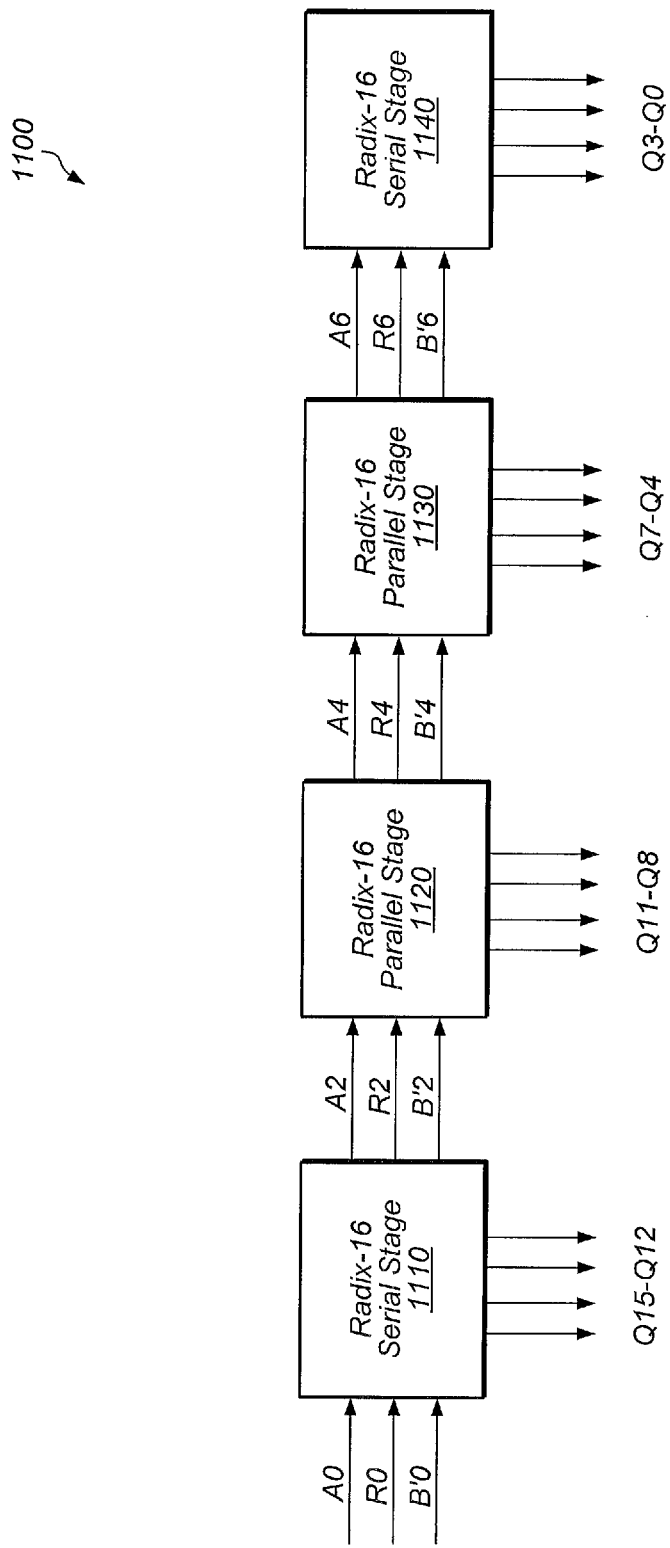
FIG. 11 is a block diagram of a four-stage divider in accordance with one or more embodiments.

Referring now to FIG. 11, a block diagram of a four-stage divider in accordance with one or more embodiments is shown. Divider 1100 may be a four-stage divider with an initial radix-16 serial stage 1110, two intermediate radix-16 parallel stages 1120 and 1130, and a final radix-16 serial stage 1140. Divider 1100 may be utilized as a divider of 16-bit dividend and divisor operands. In other embodiments, dividers may be constructed with various numbers of stages, wherein each stage is any of a variety of different restoring series and parallel architectures. For example, in one embodiment, a divider may be constructed with radix-8 serial and parallel stages for computing three quotient bits per cycle. In another embodiment, a divider may be constructed with one or more radix-8 serial stages, without the use of any restoring parallel stages. In a further embodiment, a divider may be constructed with a radix-8 serial stage as the first stage, with two or more intermediate radix-4 parallel stages, and a radix-8 serial stage as the last stage. Other combinations of radix-N serial and/or parallel stages for use in a divider are possible and are contemplated, wherein 'N' is a power of two.

Radix-16 serial stages 1110 and 1140 may be constructed with four radix-2 stages in series. In one embodiment, stage 1110 may include two instances of divider 200 (of FIG. 2) connected in series. The edge modifications of FIG. 3 and FIG. 4 may be utilized with stages 1110 and 1140, respectively. Radix-16 parallel stages 1120 and 1130 may utilize an architecture similar to the tree-like structure of stage 600 (of FIG. 6) extended for the computation of two additional quotient bits.

The values coupled to the inputs of stage 1110 may be the effective dividend (A0), partial remainder (R0), and effective divisor (B'0). Stage 1110 may calculate the four most significant quotient bits Q15-Q12 and output these to a register file or other location. Stage 1110 may also output the A2, R2, and B'2 values to stage 1120. Stage 1120 may generate quotient bits Q11-Q8 and output the A4, R4, and B'4 values to stage 1130, and stage 1130 may generate quotient bits Q7-Q4 and output the A6, R6, and B'6 values to stage 1140. Stage 1140 may generate the least significant quotient bits Q3-Q0.

As may be appreciated, the methods and mechanisms described herein may be utilized in devices that support single and/or multi-threaded processing. Additionally, it is noted that the above-described embodiments may comprise software. In such an embodiment, program instructions and/or a database (both of which may be referred to as "instructions") that represent the described methods and/or apparatus may be stored on a computer readable storage medium. Generally speaking, a computer readable storage medium may include any storage media accessible by a processor during use to provide instructions and/or data to the processor. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A circuit for performing a divide operation using a restoring division algorithm, the circuit comprising:
   a plurality of serially-connected stages, wherein each stage of said stages is configured to:
      receive as inputs on each clock cycle an effective divisor and a first partial remainder;
      generate as outputs on each clock cycle a second partial remainder and a plurality of quotient digits, wherein each generated quotient digit is selected from a set of 0 and 1, and wherein the second partial remainder is coupled to a subsequent stage;
   wherein each of a first and last stage of the plurality of stages comprises a restoring series architecture, wherein the restoring series architecture is a radix-4 series architecture for computing two quotient digits per clock cycle, and wherein the radix-4 series architecture comprises:
      a first adder that receives the first partial remainder and the effective divisor as inputs and generates a first sum and a first carry as outputs;
      a first multiplexer that receives the first partial remainder and the first sum as data inputs and the first carry as a select input;
      a second adder that receives a doubled output of the first multiplexer and the effective divisor as inputs and generates a second sum and a second carry as outputs; and
      a second multiplexer that receives the doubled output of the first multiplexer and the second sum as data inputs and the second carry as a select input, and wherein the output of the second multiplexer is doubled and coupled to a subsequent stage; and
   wherein each of one or more intermediate stages of the plurality of stages comprises a restoring parallel architecture.

2. The circuit as recited in claim 1, wherein for the first stage of the plurality of stages, the first adder is replaced with a logical AND gate to generate the first carry, and wherein the first multiplexer receives the first partial remainder and a zero value as data inputs.

3. The circuit as recited in claim 1, wherein for the last stage of the plurality of stages, the second multiplexer is removed.

4. The circuit as recited in claim 1, wherein a first quotient digit is equal to the first carry, and wherein a second quotient digit is equal to the second carry.

5. The circuit as recited in claim 1, wherein a most significant bit (MSB) of an effective dividend fills a vacated least significant bit (LSB) of the doubled output of the first multiplexer, wherein a next MSB of the effective dividend fills a vacated LSB of the doubled output of the second multiplexer, and wherein the effective dividend is quadrupled after each stage of the plurality of stages.

6. The circuit as recited in claim 1, wherein the restoring parallel architecture is a radix-4 parallel architecture for computing two quotient digits per clock cycle, and wherein the radix-4 parallel architecture comprises:
   a first adder that receives a doubled first partial remainder, the effective divisor, and a doubled effective divisor as inputs and generates a first sum and a first carry as outputs;
   a second adder that receives the first sum and the first carry as inputs and generates a second sum and second carry as outputs;
   a third adder that receives the doubled first partial remainder and the effective divisor as inputs and generates a third sum and a third carry as outputs;
   a fourth adder that receives the first partial remainder and the effective divisor as inputs and generates a fourth sum and a fourth carry as outputs;
   a multiplexer that receives the second sum, third sum, doubled fourth sum, and doubled first partial remainder as data inputs, and wherein the select input of the multiplexer is determined by the second carry, third carry, and fourth carry; and
   wherein the output of the multiplexer is doubled and coupled to an input of a subsequent stage.

7. The circuit as recited in claim 6, wherein a first quotient digit is equal to the fourth carry, and wherein the second quotient digit is determined by the second carry, third carry, and fourth carry.

8. The circuit as recited in claim 6, wherein a most significant bit (MSB) of an effective dividend fills a vacated least significant bit (LSB) of the doubled first partial remainder and the doubled fourth sum, wherein a next MSB of the effective dividend fills a vacated LSB of the doubled output of the multiplexer, and wherein the effective dividend is quadrupled after each stage of the plurality of stages.

9. The circuit as recited in claim 1, wherein the circuit is pipelined, wherein the circuit is configured to receive new dividend and divisor input operands on each clock cycle, and wherein the new dividend and divisor input operands are coupled to the first stage of the plurality of stages on each clock cycle.

10. The circuit as recited in claim 2, wherein the first partial remainder is (N−1) zero bits followed by the most significant bit of an effective dividend, wherein N is the bit-width of each of a dividend and divisor.

11. The circuit as recited in claim 9, wherein after an initial latency, the circuit is configured to generate a resultant quotient value as an output on each clock cycle.

12. A circuit comprising:
   a plurality of series of serially-connected stages, wherein each series is configured to perform a divide operation using a restoring division algorithm, and wherein the plurality of series are configured to concurrently perform a plurality of divide operations on a plurality of pairs of dividends and divisors to generate a plurality of quotients;
   wherein each series of the plurality of series comprises:
      a plurality of serially-connected stages, wherein each stage of the plurality of stages is configured to:

receive as inputs an effective divisor and a first partial remainder on each clock cycle;

generate as outputs a second partial remainder and a plurality of quotient digits on each clock cycle, wherein each generated quotient digit is selected from a set of 0 and 1, and wherein the second partial remainder is coupled to a subsequent stage;

wherein each of a first and last stage of the plurality of stages comprises a restoring series architecture, wherein the restoring series architecture is a radix-4 series architecture for computing two quotient digits per clock cycle, and wherein the radix-4 series architecture comprises:

a first adder that receives the first partial remainder and the effective divisor as inputs and generates a first sum and a first carry as outputs;

a first multiplexer that receives the first partial remainder and the first sum as data inputs and the first carry as a select input;

a second adder that receives a doubled output of the first multiplexer and the effective divisor as inputs and generates a second sum and a second carry as outputs; and a second multiplexer that receives the doubled output of the first multiplexer and the second sum as data inputs and the second carry as a select input, and wherein the output of the second multiplexer is doubled and coupled to a subsequent stage;

wherein each of one or more intermediate stages of the plurality of stages comprises a restoring parallel architecture.

13. The circuit as recited in claim 12, wherein for each first stage of each series, the first adder is replaced with a logical AND gate to generate the first carry, and wherein the first multiplexer receives the first partial remainder and a zero value as data inputs.

14. The circuit as recited in claim 12, wherein the restoring parallel architecture is a radix-4 parallel architecture for computing two quotient digits per clock cycle, and wherein the radix-4 parallel architecture comprises:

a first adder that receives a doubled first partial remainder, the effective divisor, and a doubled effective divisor as inputs and generates a first sum and a first carry as outputs;

a second adder that receives the first sum and the first carry as inputs and generates a second sum and second carry as outputs;

a third adder that receives the doubled first partial remainder and the effective divisor as inputs and generates a third sum and a third carry as outputs;

a fourth adder that receives the first partial remainder and the effective divisor as inputs and generates a fourth sum and a fourth carry as outputs;

a multiplexer that receives the second sum, third sum, doubled fourth sum, and doubled first partial remainder as data inputs, and wherein the select input of the multiplexer is determined by the second carry, third carry, and fourth carry; and wherein the output of the multiplexer is doubled and coupled to an input of a subsequent stage.

15. A processing unit configured to perform divide operations using a restoring division algorithm, wherein the processing unit comprises:

a plurality of serially-connected stages, wherein each stage of the plurality of stages is configured to:

receive as inputs an effective divisor and a first partial remainder on each clock cycle;

generate as outputs a second partial remainder and a plurality of quotient digits on each clock cycle, wherein each generated quotient digit is selected from a set of 0 and 1, and wherein the second partial remainder is coupled to a subsequent stage;

wherein each of a first and last stage of the plurality of stages comprises a restoring series architecture, wherein the restoring series architecture is a radix-4 series architecture for computing two quotient digits per clock cycle, and wherein the radix-4 series architecture comprises:

a first adder that receives the first partial remainder and the effective divisor as inputs and generates a first sum and a first carry as outputs;

a first multiplexer that receives the first partial remainder and the first sum as data inputs and the first carry as a select input;

a second adder that receives a doubled output of the first multiplexer and the effective divisor as inputs and generates a second sum and a second carry as outputs; and a second multiplexer that receives the doubled output of the first multiplexer and the second sum as data inputs and the second carry as a select input, and wherein the output of the second multiplexer is doubled and coupled to a subsequent stage;

wherein each of one or more intermediate stages of the plurality of stages comprises a restoring parallel architecture.

16. The processing unit as recited in claim 15, wherein for the first stage of the plurality of stages, the first adder is replaced with a logical AND gate to generate the first carry, and wherein the first multiplexer receives the first partial remainder and a zero value as data inputs.

17. The processing unit as recited in claim 15, wherein the restoring parallel architecture is a radix-4 parallel architecture for computing two quotient digits per clock cycle, and wherein the radix-4 parallel architecture comprises:

a first adder that receives a doubled first partial remainder, the effective divisor, and a doubled effective divisor as inputs and generates a first sum and a first carry as outputs;

a second adder that receives the first sum and the first carry as inputs and generates a second sum and second carry as outputs;

a third adder that receives the doubled first partial remainder and the effective divisor as inputs and generates a third sum and a third carry as outputs;

a fourth adder that receives the first partial remainder and the effective divisor as inputs and generates a fourth sum and a fourth carry as outputs;

a multiplexer that receives the second sum, third sum, doubled fourth sum, and doubled first partial remainder as data inputs, and wherein the select input of the multiplexer is determined by the second carry, third carry, and fourth carry; and wherein the output of the multiplexer is doubled and coupled to an input of a subsequent stage.

* * * * *

UNITED STATES PATENT AND TRADEMARK OFFICE
CERTIFICATE OF CORRECTION

| | |
|---|---|
| PATENT NO. | : 8,892,622 B2 |
| APPLICATION NO. | : 13/081991 |
| DATED | : November 18, 2014 |
| INVENTOR(S) | : Olson et al. |

It is certified that error appears in the above-identified patent and that said Letters Patent is hereby corrected as shown below:

On Title page, column 2, Item (56), under Other Publications, line 6, delete "atAustin," and insert -- at Austin, --, therefor.

In the Specification

In column 1, line 30, delete "though" and insert -- through --, therefor.

Signed and Sealed this
Twenty-third Day of June, 2015

Michelle K. Lee
*Director of the United States Patent and Trademark Office*